United States Patent [19]

Andres

[11] 4,092,851
[45] June 6, 1978

[54] APPARATUS FOR THE MEASUREMENT OF VEHICLE FUEL CONSUMPTION

[76] Inventor: Klaus Andres, 207 Dogwood La., Berkeley Heights, N.J. 07922

[21] Appl. No.: 695,839

[22] Filed: Jun. 14, 1976

[51] Int. Cl.$^2$ .............................................. G01L 3/00
[52] U.S. Cl. ...................................................... 73/114
[58] Field of Search .................. 73/113, 114; 235/61 J

[56] References Cited

U.S. PATENT DOCUMENTS

| | | | |
|---|---|---|---|
| 2,697,939 | 12/1954 | Martin et al. | 73/113 |
| 2,927,461 | 3/1960 | Welch et al. | 73/113 |
| 3,686,507 | 8/1972 | Krutz et al. | 324/168 |

*Primary Examiner*—Anthony V. Ciarlante

[57] ABSTRACT

The rate of fuel consumption of a vehicle is measured by an apparatus which measures the distance traveled by the vehicle during the consumption of a fixed quantity of fuel. A linkage unit in series with the odometer cable produces electrical pulses, which drive a counter in direct relation to the distance traveled. A fuel flow sensor unit is inserted in the fuel line between the fuel pump and the fuel flow regulator of the vehicle engine. The sensor includes a U-tube partially filled with an electrolyte. As fuel is consumed by the engine, the electrolyte rises in one arm of a U-tube. The counter is turned on and then turned off as the electrolyte rises to the level of one and then another metallic contact in the tube. The distance between the contacts and the cross section area of the tube determines the fixed volume of fuel. The number of pulses counted determines the distance traveled during the consumption of the fixed volume of fuel. Appropriate design of the linkage unit and the sensor unit makes the counter read directly in the desired units of fuel consumption rate (e.g. miles per gallon). An exemplary device has been constructed which is direct reading in tenths of a mile per gallon.

9 Claims, 5 Drawing Figures

APPARATUS FOR THE MEASUREMENT OF VEHICLE FUEL CONSUMPTION

BACKGROUND OF THE INVENTION

(1) Field of the Invention

The invention is in the field of automotive accessories, more particularly to devices measuring engine efficiency and performance.

(2) Brief Description of the Prior Art

Automobiles and other motor vehicles contain a number of guages and indicators which serve to keep the operator informed of the operating condition of the vehicle. Standard cars have fairly rudimentary indicators, for example, of speed, engine temperature, oil pressure and electrical system operation. Drivers with more interest in the details of operation of their vehicles can equip their vehicles with tachometers, oil pressure guages, ammeters and the like. Recent increases in the price of automobile fuels have resulted in a heightened interest in fuel consumption economy. As a result of this interest, literature in the area of fuel consumption rate meters has increased. In particular, one recent article (*Electronic Design News* (Jan. 20, 1976) 61) describes a device which electronically divides the outputs of a commercially available vehicle velocity meter and a commercially available flow rate meter to produce an indication of distance of travel per unit of fuel consumption (i.e. miles per gallon). The inventive device to be described below is a direct reading and self calibrated measurer of this quality.

SUMMARY OF THE INVENTION

A simple, rugged fuel consumption meter has been developed which produces a periodic numeric display, typically, several times a minute, as the vehicle is traveling. With this meter, the driver can monitor the performance of his vehicle under all driving conditions. He can determine the most efficient driving speed. He can directly evaluate the performance, in his vehicle, of different grades and brands of fuel. He can determine when his engine needs to be tuned again. All of these features can result in fuel economy.

The rate of fuel consumption is measured by an apparatus which measures the distance traveled by the vehicle during the consumption of a fixed quantity of fuel. A linkage unit in series with the odometer cable produces electrical pulses, which drive a counter in direct relation to the distance traveled. A fuel flow sensor unit is inserted in between the fuel pump and the fuel flow regulator of the vehicle engine. The sensor includes a U-tube partially filled with an electrolyte. As fuel is consumed by the engine, the electrolyte rises in one arm of the U-tube. The counter is turned on and then turned off as the electrolyte rises to the level of one and then another metallic contact in the tube. The distance between the contacts and the cross section area of the tube determine the fixed volume of fuel. The number of pulses counted determines the distance traveled during the consumption of the fixed volume of fuel. Appropriate design of thelinkage unit and the sensor unit makes the counter read directly in the desired units of fuel consumption rate (e.g. miles per gallon). An exemplary device has been constructed which is direct reading.

The meter is fail safe so that during malfunction, the fuel can still flow, unhindered, to the engine. The meter is inherently calibrated and requires no calibration procedures. Usefulness of the device can be further enhanced by incorporating in the electronic counter, a simple calculator which, at the push of a button, displays the average of the last 100, 1000 or 10000 readings. These readings would indicate the average number of miles that the car traveled per gallon during these periods. The device is easily installed in cars and can for example, be used by car dealers to convince their customers of the claimed gasoline milage of new cars.

DETAILED DESCRIPTION OF THE INVENTION

The disclosed inventive device directly measures the distance traveled by the vehicle during the consumprion of a fixed quantity of fuel. The distance traveled is measured by counting a series of pulses produced by rotation of the odometer cable (or analogous rotating linkage driven by rotation of the vehicle's drive train). The consumption of a fixed quantity of fuel is measured in a fuel flow sensor unit, inserted between the vehicle's fuel pump and the carburetor (or analogous fuel flow control device). The number of pulses per rotation of the odometer cable and the volume of the fixed quantity of fuel can be selected such that a direct count of the number of pulses observed during the consumption of the fixed quantity of fuel, yields a direct reading indication of the fuel economy of the vehicle in miles per gallon, kilometers per liter, or any other such units.

Figure 1:
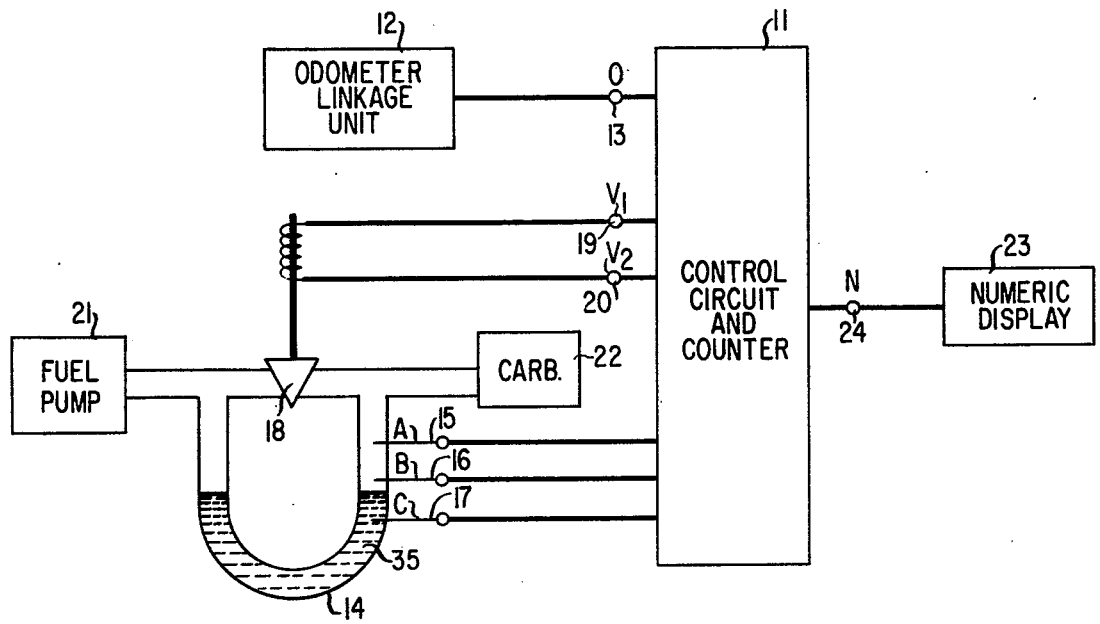
FIG. 1 is a schematic diagram of an exemplary device of the invention.

FIG. 1 shows a schematic diagram of the device of the invention. The control circuit and counter 11 receive a distance related pulse train from the odometer linkage unit 12 through input connection "O" 13. The fuel consumption indications are received from the fuel flow sensor unit 14 through input connections "A", "B" and "C" 15, 16, 17. The valve 18 is opened and closed by connections "$V_1$" and "$V_2$" 19, 20. The fuel flow sensor unit 14 is inserted between the fuel pump 21 and the carburetor 22. The results of the pulse train count are exhibited on a numeric display 23, driven through connection "N" 24. The device operates cyclically and, in one exemplary constructed device, updates the display every 5 to 10 seconds.

Figure 2:
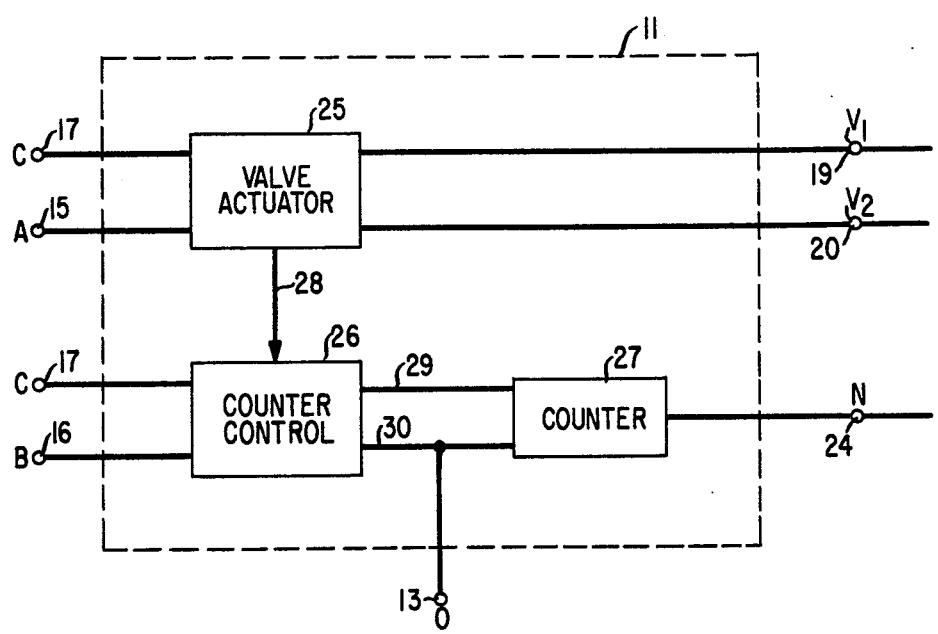
FIG. 2 is a block diagram of the control circuit and counter portion of the device of FIG. 1.
Figure 3:
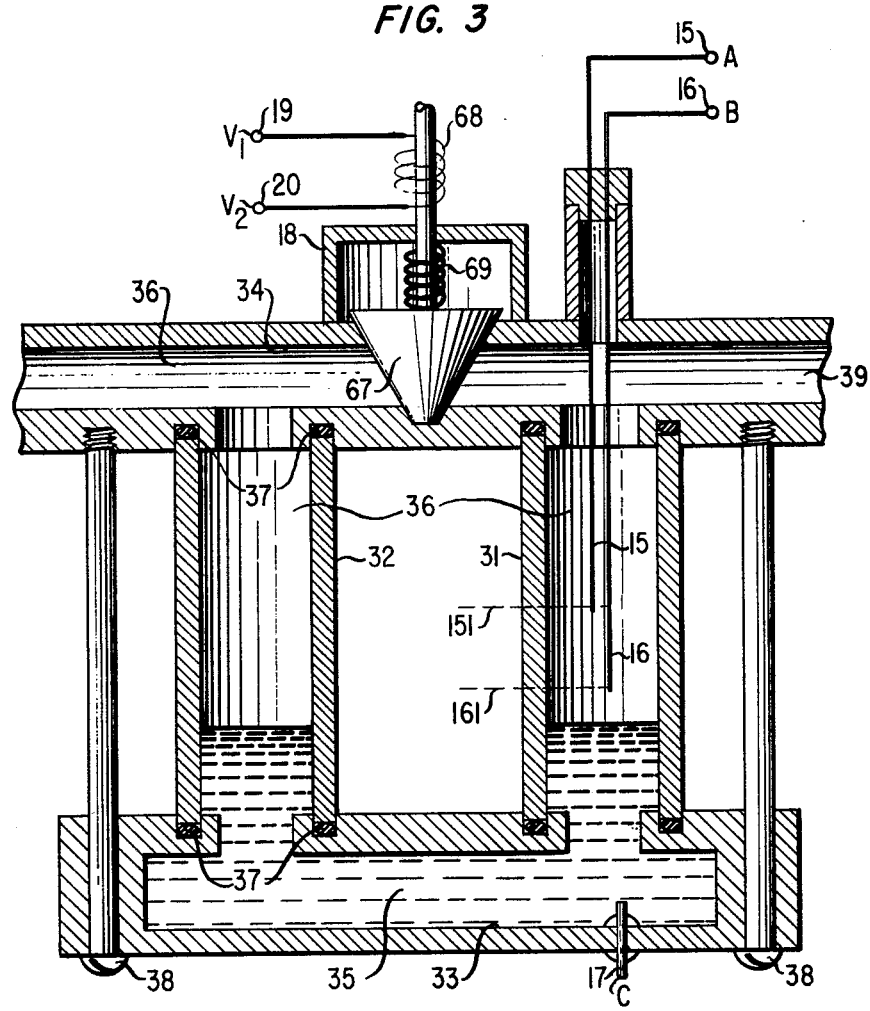
FIG. 3 is an elevational view in section of an exemplary fuel flow sensor unit portion of the device of FIG. 1.

The operation of the device can be understood by consideration of FIGS. 1, 2 and 3. FIG. 2 is a block diagram of the control circuit and counter 11 of FIG. 1. FIG. 3 shows an exemplary fuel flow sensor unit. The unit has an input port 36 and an output port 39 connected by an upper fuel path 34 and a lower fuel path 33 including an input column 32 and an output column 31. The upper fuel path 34 includes an electrically actuated valve 18, such as a solonoid valve. The valve is opened or closed by electrical excitation of $V_1$ and $V_2$ (19, 20). In the exemplary device shown, the input and output columns 31, 32 are sealed to the body of the unit by O-rings 37, held in compression by screws 38. The output column 31 is provided with an upper, center and lower contact 15, 16, 17. It contains a quantity of electrolyte 35, which is denser and not miscible with the fuel being monitored 36.

Just prior to the start of a measuring cycle the valve 18 is open and the electrolyte 35 has come to the same level in the two arms 31, 32 so that the electrolyte level in the output arm lies between the lower contact 17 and the center contact 16. The valve 18 is then closed by a suitable excitation (or deexcitation) of $V_1$ and $V_2$ (19,20), starting a measurement cycle. Upon closure of the valve, the continued fuel pressure at the input port 36 forces the fuel down into the input column 32, maintaining unimpeded flow from the output port 39. As fuel is consumed by the vehicle engine, the electrolyte 35 rises in the output column 31. When the electrolyte reaches the level of the center contact 16, indicated by the dashed line 161, an electrical current flow between the lower contact 17 and the center contact 16 causes the counter control 26 to send a reset signal over lead 29 to the counter 27, resetting the counter 27 to zero. Simultaneously, the counter control 26 energizes the count lead 30 so as to permit the counter 27 to count pulses from the input connection "O" 13 from the odometer linkage unit 12. The count is transmitted to the display 23 through lead 24.

As the count progresses, the entire fuel consumption of the vehicle comes from the output column 31 as the level of the electrolyte 35 rises between the level of the center electrode 16 (dashed line 161) and the level of the upper electrode 15 (dashed line 151). When the electrolyte reaches the upper electrode, current flow between the upper electrode 15 and the lower electrode 17 causes the valve actuator 25 to open the valve 18 by signals over leads 19, 20. Simultaneously, the valve actuator halts the count by a signal to the counter control 26 over actuator link 28. The count remains displayed during the recovery and readout time interval until reset to zero at the beginning of the next measurement cycle. During this recovery and readout time interval, the electrolyte level equilibrates to the same level in both columns 31, 32 in preparation for the start of the next measurement cycle.

Figure 4:
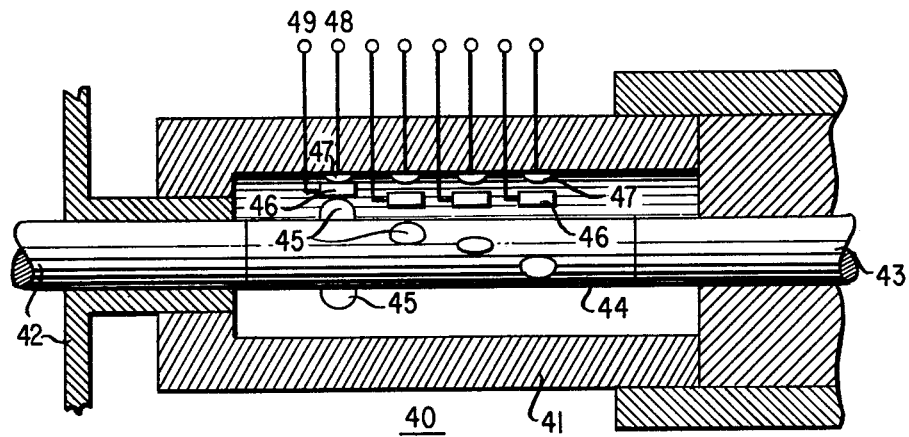
FIG. 4 is an elevational view, partially in section, of an exemplary odometer linkage unit portion of the device of FIG. 1.

FIG. 4 shows, in somewhat representational form, an exemplary odometer linkage unit 40. The unit 40 is inserted between the odometer 42 of the vehicle and the odometer cable 43. The housing 41 has a set of fixed contacts 47, connected to connections 48 and a set of movable contacts 46, connected to connections 49. The shaft 44 includes a set of projections 45, equally spaced around the shaft, so situated as to produce contact closure as each projection 45 rotates past a pair of contacts 46, 47. A similar pulse train can be produced by fixing one or more magnets in the shaft 44 and one or more pick-up coils in the housing 44 (or vice versa).

Exemplary Circuitry

Figure 5:
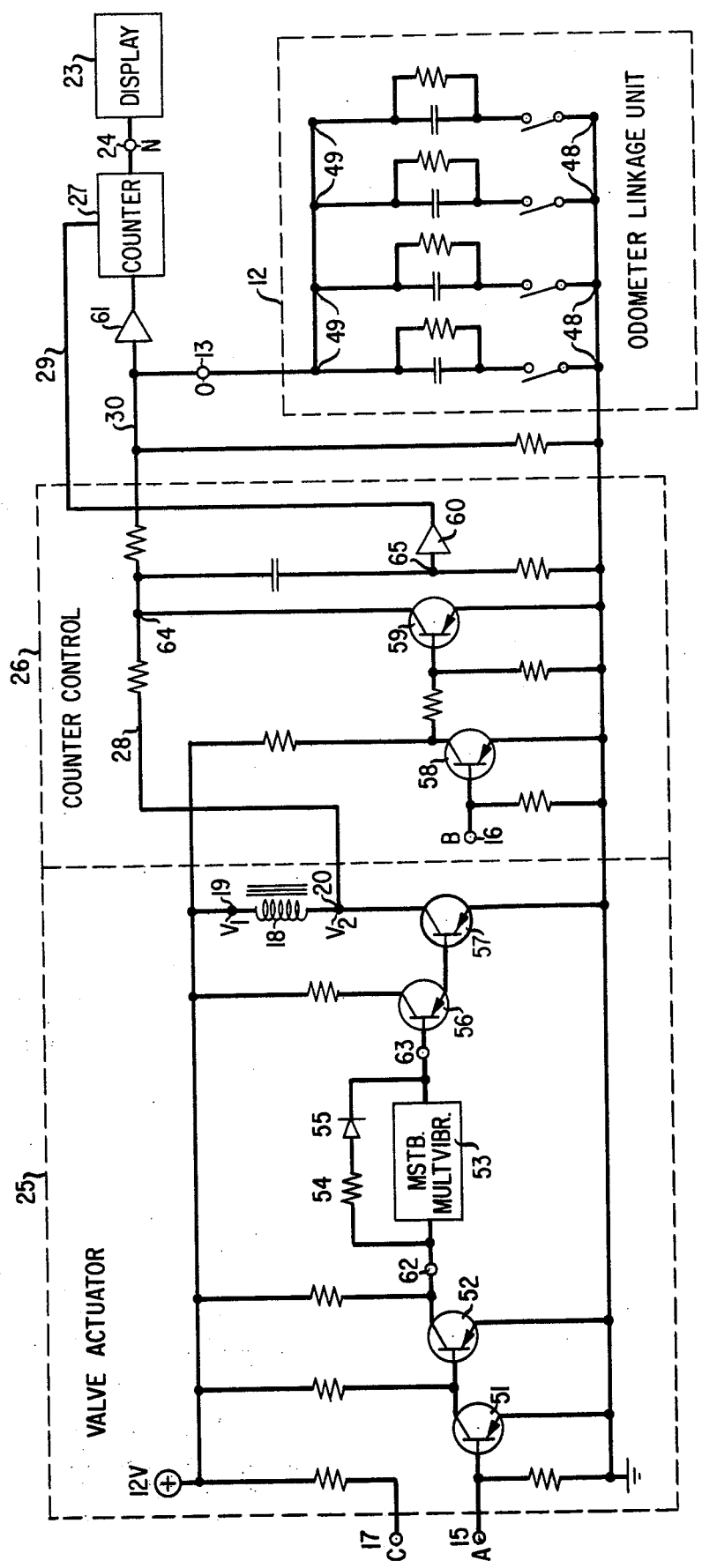
FIG. 5 is an exemplary circuit diagram of the device in FIG. 2.

FIG. 5 shows an exemplary circuit for carrying out the functions of the block diagrams of FIGS. 1 and 2. The particular semiconductor diodes and circuit element values are chosen by the circuit designer to suit the valve 18 being driven and the desired value of the recovery and readout time, among other factors. The operation of the circuit is as follows:

Whenever the electrolyte level in the output column 31 reaches electrode "A" 15, transistor 51 is turned on and transistor 52 turned off. This increases the voltage at points 62 and 63, triggers the monostable multivibrator 53, and causes transistor 56 and the power transistor 57 to fire and to energize the magnet coil which lifts the plunger in the valve 18. The magnet coil stays energized for the time, $t$, that the output 63 of the monostable multivibrator 53 remains high. This time can be set by connecting a suitable resistor 54 and the capacitor 55 to 53 (an integrated circuit), it is typically a few seconds. If, after this time the electrolyte 35 has not dropped below electrode "A" 15 for some reason(such as a malfunction of the valve 18), the magnet coil stays energized until the electrolyte level drops, since the voltage at points 63 is still high. The time, $t$, is set such as to permit the two electrolyte levels in the U-tube to equalize and the driver to read the miles per gallon indication, before a new cycle is started.

The electronic counter, for example, is built with standard transistor-transistor-logic integrated circuit components and is not shown in detail. The start of a measuring cycle is given by the time the valve 18 closes. The electrolyte in the output column 31 then begins to rise. When it reaches electrode B16, transistor 58 is turned on and transistor 59 turned off. This results in an increased positive voltage at 64 and a transient positive voltage at 65. The latter voltage pulse is shaped by a monostable multivibrator 60 and is used to set the electronic counter 27 to zero through the connection 29. As long as the electrolyte level is between electrodes 15 and 16, there is a positive voltage on lead 30 and the counter 27 counts negative voltage pulses which are generated by the odometer linkage unit 12. Each of the four contacts 46, 47 shown in FIG. 4 closes twice during one revolution of the odometer cable 43, so that the counter 27 receives eight negative pulses per revolution. As the electrolyte level reaches electrode 15 the valve 18 opens and the voltagesom leads 28 and 30 drop to near zero. The counter 27 then stops and displays the count until it is reset to zero again at the beginning of the new counting cycle.

Fail Safe Features

There are fail-safe features incorporated in the design of the inventive device. The primary concern, from a device failure point of view, is that if the device fails, the operation of the vehicle will not be affected. In this respect, a malfunction which sticks the valve 18 in an open position or in a closed position will not impede the flow of fuel if a simple design precaution is observed. First, if the valve is stuck open, there is no problem. Second, if the valve is stuck closed or fails to open for any reason, fuel can pass through the lower fuel path if the volume of electrolyte is less than the volume of the output column. If this is the case, then the lighter fuel will bubble up through the electrolyte before the electrolyte is pushed out of the output column and into the engine of the vehicle. Further, if the lower fuel path 13 becomes blocked (e.g. if the electrolyte freezes), the valve 18 can be constructed so that the pumped fuel exerts sufficient upward force on the plunger 67 to overcome the restoring spring 69. Thus, fuel can flow to the output port 39 even though the valve 18 is not electrically activated, maintaining the fuel flow to the vehicle engine.

The denser immiscible electrolyte used in the exemplary constructed embodiment of the invention is an aqueous NaCl solution. The NaCl served to increase the conductivity of the solution and to suppress freezing in cold weather. Other salts in aqueous solution (e.g. CsCl) or other fluids meeting the requirements of 1) higher density than the fuel being measured, 2) immiscibility with the fluid being measured, 3) some electrical conductivity can be used.

The distance that the car travels is measured by electronically counting the revolutions of the odometer cable. In many American cars, one revolution equals $10^{-3}$ miles. If the counter is electronically turned on during the time it takes for $10^{-3}$ gallons of gasoline to flow into the carburetor, the count it reaches is a direct measure of the number of miles traveled per gallon of gas during this time interval (usually between 5 and 10 seconds). To obtain a reading in tenths of miles per gallon, fractions of odometer revolutions such as ⅛ of a revolution can be counted during the time it takes to pass 1/800 of a gallon of gasoline. Such a pulse train can be produced by providing a set of eight projections 45 equally spaced around the shaft 44 of FIG. 4.

What is claimed is:

1. Vehicle fuel consumption rate measurement apparatus comprising control circuitry, an odometer linkage unit, electrically connected to the control circuitry, a fuel flow sensor unit electrically connected to the control circuitry, and a numeric display electrically connected to the control circuitry wherein (a) the odometer linkage unit includes means for producing an electrical pulse train, in which the number of pulses is related to the distance traveled by the vehicle, to drive a counter in the control circuitry;

(b) the fuel sensor unit includes a fuel input port and a fuel output port with an upper fuel path and a lower fuel path therebetween, the upper fuel path including an electrically actuated valve which is adapted for being switched by the control circuitry to an open position and a closed position, and the lower fuel path including an input column and an output column extending downward of the upper fuel path on either side of the valve, the output column including a lower electrical contact, a center electrical contact and an upper electrical contact, the lower fuel path containing a body of electrolyte, which electrolyte is denser than the fuel and not miscible with the fuel, which said electrolyte is included in sufficient quantity to fill the input and output columns to a level between the lower contact and the center contact;

(c) the numeric display is adapted for being activated by the control circuitry to indicate fuel consumption; and (d) the control circuitry includes a valve actuator, electrically connected to the upper contact and the lower contact, for opening the valve during a preselected recovery and readout time interval, which is initiated when the electrolyte bridges between the upper contact and the lower contact, a counter, a counter control electrically connected to the center contact and the lower contact and to the valve actuator by an actuator link and to the counter, which counter control includes means for resetting the counter to zero and enabling the counter to respond to the electrical signal from the odometer linkage unit when the electrolye bridges between the center contact and the lower contact, which counter control also includes means for disabling the counter from further response at the start of the recovery and readout time interval upon receiving a signal from the actuator link; in which said apparatus the number of pulses per unit distance travelled and the volume of the output column between the center electrical contact and the upper electrical contact are selected such that the count registered in the counter and displayed on the display is a direct reading of the fuel consumption rate.

2. A device of claim 1 in which the volume of the body of electrolyte is less than the volume of the output column.

3. A device of claim 1 in which the odometer linkage unit is adapted for the insertion between the odometer cable and the odometer of the vehicle and includes pulsing means for producing a preselected number of electrical pulses for every revolution of the odometer cable.

4. A device of claim 3 in which the pulsing means includes a rotatable shaft, fixed to the odometer cable, which said shaft includes a set of projections equally spaced around the shaft, and which said pulsing means also includes a set of contacts so situated as to produce a contact closure as each projection rotates past the contacts.

5. A device of claim 3 in which the pulsing means includes at least one magnet and at least one pickup coil, disposed in relation to one another so as to produce a magnetically induced current pulse as each magnet and coil is rotated with respect to one another.

6. A device of claim 1 in which the valve is a solonoid valve.

7. A device of claim 1 in which the body of electrolyte is an aqueous solution.

8. A device of claim 7 in which the solution includes NaCl as a solute.

9. A device of claim 1 in which the valve actuator includes a monostable multivibrator to fix the recovery and readout time interval.

* * * * *